H. J. SAUVAGE.
MOTOR VEHICLE.
APPLICATION FILED AUG. 4, 1915.
1,346,914. Patented July 20, 1920.
3 SHEETS—SHEET 1.
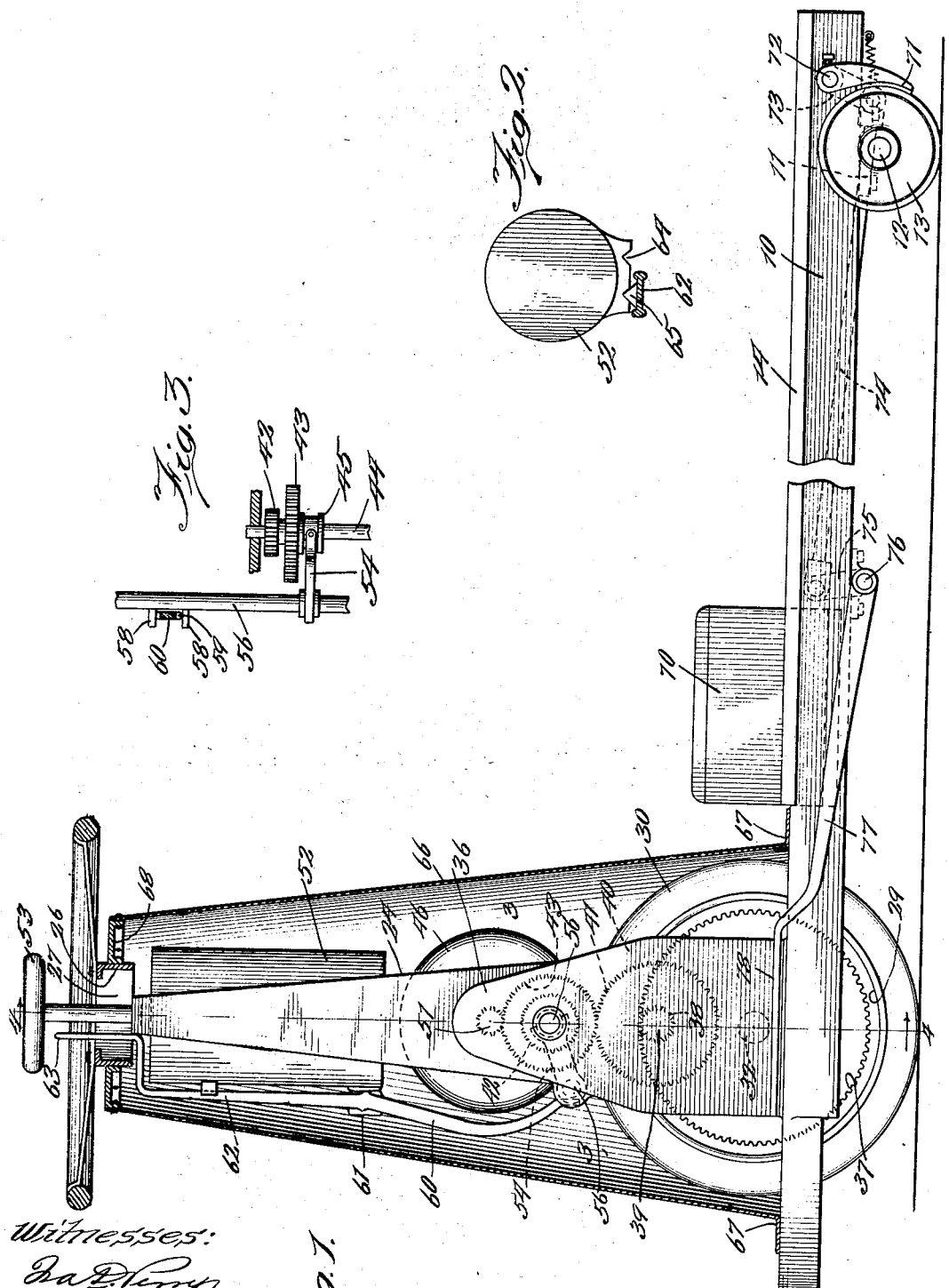

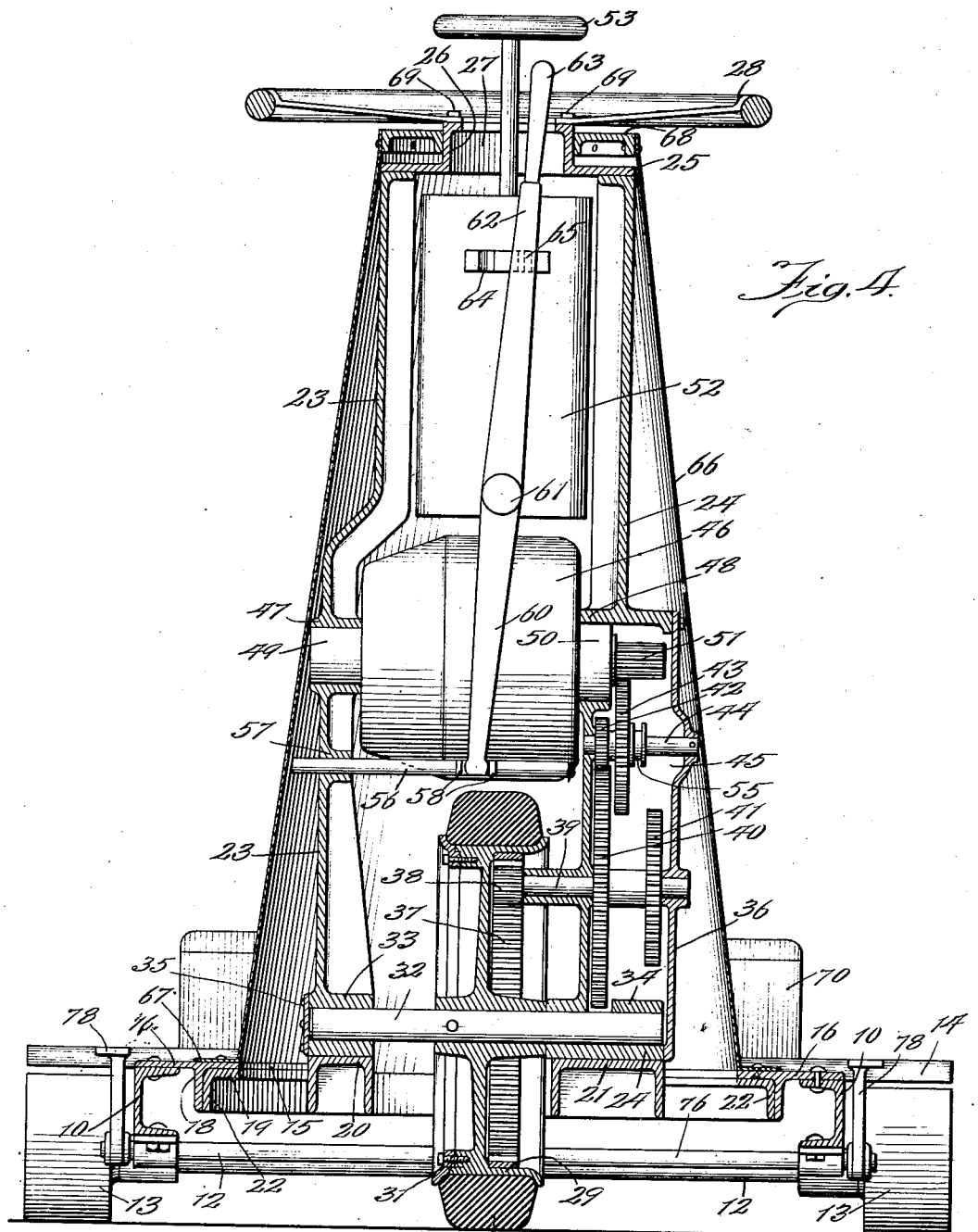

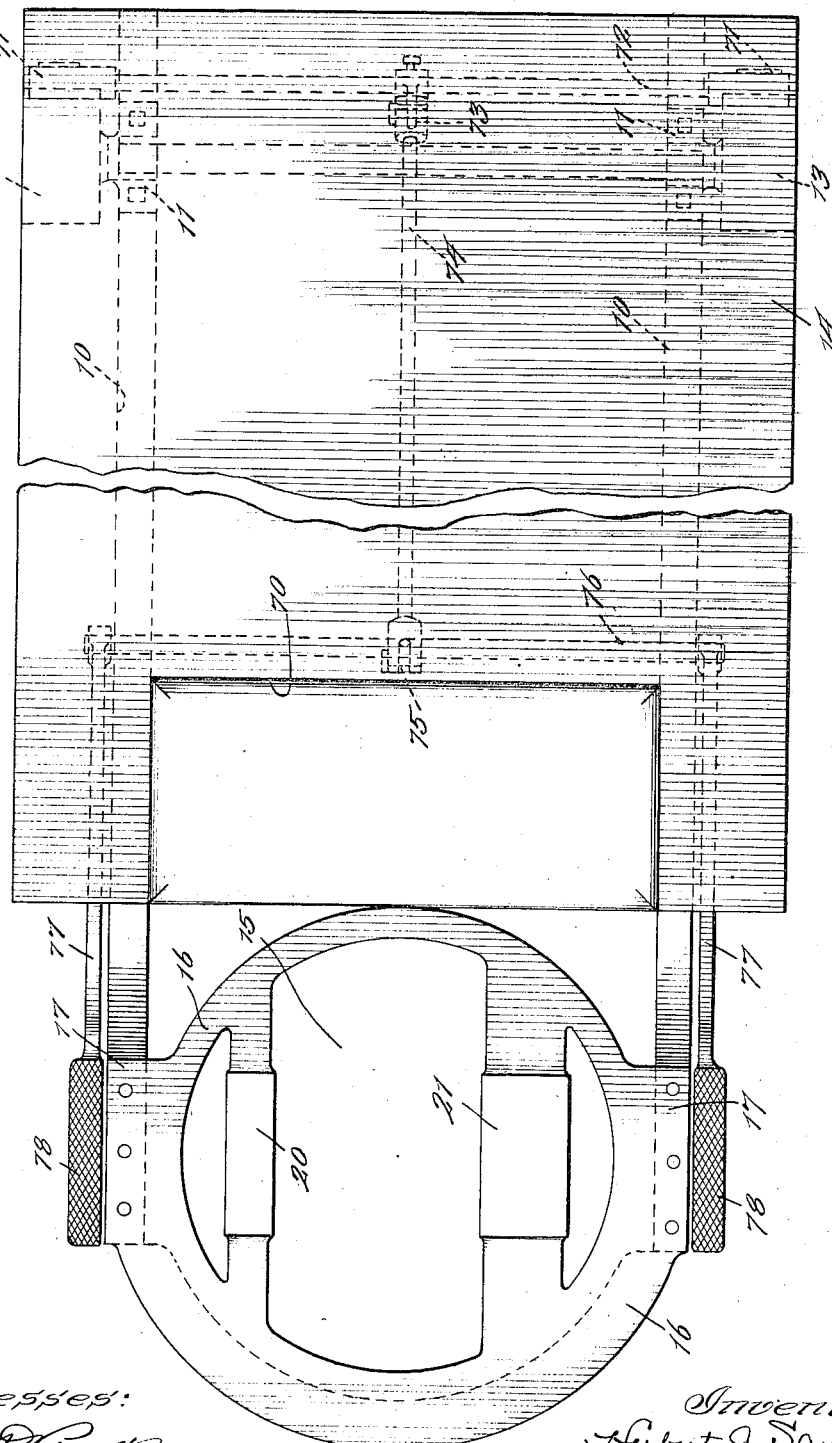

UNITED STATES PATENT OFFICE.

HERBERT J. SAUVAGE, OF CHICAGO, ILLINOIS.

MOTOR-VEHICLE.

1,346,914.                     Specification of Letters Patent.      Patented July 20, 1920.

Application filed August 4, 1915. Serial No. 43,511.

*To all whom it may concern:*

Be it known that I, HERBERT J. SAUVAGE, a subject of the King of England, residing at Chicago, in the county of Cook and State of Illinois, have invented certain new and useful Improvements in Motor-Vehicles, of which the following is a specification.

This invention relates in general to motor vehicles and more particularly to trucks of the three wheel type, especially designed for baggage rooms, warehouses and similar purposes, where it is necessary at times to operate and turn the truck in a small or limited space, and the invention has for one of its objects to provide an improved truck of this character, in which the number of parts in the construction and of the operating mechanism is reduced to a minimum.

A further object is to provide an improved machine of this type having the steering mechanism so arranged that the operator may stand in any position with respect to the driving wheel, so as to be always in a safe position, and at the same time be able to operate the brake mechanism from any position on the truck, adjacent the steering mechanism.

A further object is to provide an improved machine of this character wherein a single driving wheel is employed, and in which machine, the drive wheel, operating gearing therefor, the motor, the controller and the supports therefor may be quickly and readily removed or detached from the body of the vehicle, as a single unit and as readily replaced, and in which the operating parts for the motor are all arranged in a hollow steering post.

A further object is to provide an improved device of this character which will be simple, durable and cheap in construction and effective and efficient in operation.

To the attainment of these ends and the accomplishment of other new and useful objects as will appear, the invention consists in the features of novelty, in substantially the construction, combination and arrangement of the several parts hereinafter more fully described and claimed and shown in the accompanying drawings illustrating the invention and in which:

Figure 1 is a view partly in vertical section and partly in side elevation of an improved machine of this character constructed in accordance with the principles of this invention.

Fig. 2 is a detail plan view of the gear shifting lever and the holding means therefor.

Fig. 3 is a detail view partly in section, of the gear shifting mechanism.

Fig. 4 is a vertical sectional view taken on line 4—4, Fig. 1.

Fig. 5 is a top plan view of the parts shown in Fig. 1.

The frame of the truck may be constructed in any suitable manner, such as by means of channel irons 10, constituting the side members of the frame, and supported by these members adjacent the rear of the frame are bearings 11, in which is journaled an axle 12 having secured thereto the wheels 13, and the axle extends entirely across the frame. A platform 14 is also supported by the side members and the platform at one end of the frame is provided with an opening 15, formed in any suitable manner, preferably by means of an annular member 16 which is secured to the platform by means of the laterally projecting portions 17 and this annular member 16 is provided with a depending flange 18 surrounding the opening 15.

The steering mechanism is supported by a turntable 19 which is also preferably of an annular construction having cross members 20, 21 secured thereto, and this turntable is provided with a peripheral flange 22, adapted to stand within the flange 18 of the member 16 and to turn freely therein.

Mounted upon the cross bars 20, 21 are uprights 23, 24, and these uprights are secured in position in any suitable manner such as by means of fastening devices for securing the uprights to the respective cross bars 20, 21.

These uprights are of any desired height according to the height of the steering column, and secured to the top of these uprights is a member 25, having a reduced upwardly projecting portion 26 which latter is provided with an aperture or opening 27 therethrough, and to which portion 26, a steering wheel 28 of any desired diameter is secured, so that when the steering wheel 28 is turned, the uprights 23, 24 will be correspondingly turned as will also the turntable 19. All of the steering and propelling mechanism is mounted upon the turntable 19 and the uprights 23, 24, and the driving or traction wheel 29 is also mounted to swing with the uprights. This traction wheel 29 is preferably provided with a rubber tire 30 and is held in position by means of a detachable section 31 of the wheel rim. The traction wheel is mounted between the uprights 23, 24, by means of an axle or shaft 32, which is journaled in suitable bearings 33, 34 and the space between the uprights is somewhat greater than the width of the wheel so that when it is desired to remove the tire 30 from the wheel, sufficient space is provided between the uprights. The wheel 29 is secured to the shaft 32 for rotation therewith and this shaft 32 is shiftable longitudinally in its bearings, being held against longitudinal adjustment in one direction by means of a cap plate 35 and against longitudinal movement in the opposite direction by means of a cover plate 36, to be hereinafter described.

Thus it will be seen that when it is desired to remove the wheel 29, the cap plate 35 may be removed and the wheel correspondingly adjusted and after the fastening device between the wheel and axle has been removed, the wheel may also be correspondingly moved. The traction wheel 29 is provided with an internal gear 37 with which a pinion 38 meshes. The pinion is secured to a shaft 39 mounted in suitable bearings and connected with the shaft 39 to rotate therewith, are gears 40, 41 preferably of different diameters. A pinion gear 42 is provided to mesh with the gear 40 and connected with this pinion gear 42 is another gear 43 which is adapted to mesh with the gear 41 and these gears 42, 43 are slidably mounted upon a supporting axle 44, which latter is of such a length as to permit the gears 42, 43 to be moved into and out of mesh with the gears 40, 41 and the gears 40, 41 are so arranged with respect to each other and with respect to the gears 42, 43 that when one of the gears 42, 43 is moved into engagement with its respective gear 40, 41, the other will be moved out of engagement with its respective gear. The gears are provided for the purpose of changing the speed of the vehicle when desired.

The axle 44 is supported in any suitable manner, preferably by means of the upright 24, and the cover plate 36, the upright 24 being so shaped as to form a chamber 45 within which the gears 40, 41, 42, and 43, are arranged, and the cover plate 36 closes the chamber 45 in such a manner as to produce an oil-proof casing, into which oil may be placed to lubricate the gears.

A motor 46 is supported by the uprights 23, 24, preferably by means of bearings 47, 48, into which projections 49, 50 on the motor casing are seated and connected with the motor shaft is an elongated gear 51, with which the gear 43 meshes. This gear 51 may be constructed of any suitable material, such as raw hide or the like, and is of such a length that the gear 43 will always remain in mesh therewith while the gears 42, 43 are being shifted with respect to the gears 40, 41.

The motor 46 is arranged above the traction wheel 29, and mounted upon the uprights 23, 24 is a controller 52 of any desired and suitable type, and this controller is operated by a suitable handle 53, which is connected therewith and which extends through the opening 27 in the cap piece 25, so that the operating handle 53 of the controller will be in a convenient position for the operator when operating the steering wheel 28.

The gears 42, 43 may be shifted in any suitable manner, preferably by means of an arm 54 which is provided with a bifurcated extremity entering a grooved collar 55 connected with the gears. This arm 54 is connected with a bar 56, mounted to slide in suitable bearings 57 in the uprights and the bar 56 is provided with spaced projections 58, between which the extremity 59 of a lever 60 operates. This lever 60 is pivoted intermediate its ends as at 61 upon a suitable support and the upper portion 62 of the lever 61 is constructed so as to be naturally springy, the extremity of the portion 62 terminating in a handle 63 extending through the opening 27 of the member 25, terminating adjacent the handle 53 and steering wheel 28.

Arranged in any suitable position, preferably upon the controller casing 52 are spaced notched portions 54, and the portion 62 of the lever 60 is provided with a projection 65, adapted to enter these notches for maintaining the gears 42, 43 in the adjusted positions.

In order to shift the gears, all that is necessary is to spring the portion 62 of the lever 60 so as to move the projection 65 out of one of the notches 64 and then rock the lever about its pivot 61 until the desired position of the gears is obtained.

In order to protect the steering mechanism, a casing 66 is provided and this casing is preferably of a conical configuration, having a flanged base 67 which is secured to the body of the truck, preferably to the member 16 as shown in Fig. 4. The casing 66 extends to a point about the body of the cap member 25, and is secured at its upper extremity to an annular member 68 which latter surrounds the portion 26 of the member 25 and between the member 25 and the wheel 28.

With this construction it will be manifest that the casing not only protects the steering mechanism and prevents the operator from leaning against the steering mechanism when operating the machine, but serves as a brace for the steering column. Furthermore, all of the parts, including the motor, the electric controller therefor and the driving connection between the motor and the traction wheel are all arranged in the hollow steering head and rotatable with the head about an upright axis.

When it is desired to remove the steering mechanism all that is necessary is to remove the fastening devices 69 and handle 53 and then raise the truck bodily, which operation will cause all of the steering mechanism, the motor, the controller and the traction wheel 29 to be removed from the truck with the turntable 19, as a single unit, and when it is desired to replace the steering mechanism, it may as readily be replaced.

If it is desired to gain access to the traction wheel, while the parts are assembled, obviously suitable openings may be provided in the casing 66 for that purpose.

The batteries necessary for the operation of the truck may be provided within the casing 70, which is preferably arranged adjacent the forward part of the machine, so that the greater portion of the weight of the structure will be maintained upon the traction wheel 29.

With this construction of steering mechanism it will also be manifest that it will be easy of operation, due to the fact that the direction of pull of the vehicle is always in the direction of motion thereof.

The diameter of the casing 66 is such that a platform or support will be provided entirely around the casing so as to permit the operator to stand in any position around the casing to insure his being out of danger and will also enable him to stand in any position he desires so as to face the direction in which the truck is moving, whether forwardly or backwardly.

The provision of a platform around the steering mechanism also enables the operator to actuate the brakes 71 from any position around the steering mechanism. These brakes may be of any desired construction and are arranged adjacent the rear wheels 13. The brakes are preferably connected by means of a shaft 72 journaled in suitable bearings and extending across the frame work and connected with this shaft is an arm 73 to which a bar or rod 74 is connected and this bar is also connected with an arm 75 on a rock shaft 76, the latter being preferably suspended below the frame and journaled in suitable bearings. An operating lever 77 is arranged on each side of the truck and these levers terminate in treadles 78 arranged adjacent the platform of the truck, so that the operator can readily actuate the lever from either side of the truck by pressing upon the treadle 78.

With this improved construction, it is possible to obtain two speeds to meet the existing conditions and turn in a minimum space, and all of the operating mechanism is not only protected but is concealed thereby rendering it impossible to be damaged, and furthermore the platform 14 is arranged at a very low elevation from the floor or surface of the ground and is of such a construction as to produce the maximum loading space, and the casing 70 in which the batteries are arranged being also at a low elevation permits articles to be loaded thereon.

What is claimed as new is:

1. A motor vehicle embodying a load receiving platform, a traction wheel connected with the platform and rotatable on horizontal and upright axes, a steering column with which the wheel is connected, said column movable with the wheel about said upright axis, a motor supported by the column and operatively connected with the wheel for rotating it on such horizontal axis, and a support upon which the operator may stand at any point around the column.

2. A motor vehicle embodying a load receiving platform, a traction wheel connected with the platform and rotatable on horizontal and upright axes, a steering column with which the wheel is connected, said column movable with the wheel about said upright axis, a motor external to the wheel and supported by the column and operatively connected with the wheel for rotating it on such horizontal axis, and a steering device connected with the column for rotating the latter.

3. A motor vehicle embodying a load receiving platform, a traction wheel connected with the platform and rotatable on horizontal and upright axes, a steering column with which the wheel is connected, said column movable with the wheel about said upright axis, a motor external to the wheel and supported by the column and operatively connected with the wheel for rotating it on such horizontal axis, a steering wheel and means connecting the steering wheel directly with said column for rotating the latter.

4. A motor vehicle embodying a load receiving platform arranged at a low elevation, a traction wheel connected with the platform and rotatable on horizontal and upright axes, a steering column with which the wheel is connected, said column movable with the wheel about said upright axis, a motor supported by the column and operatively connected with the wheel for rotating it on such horizontal axis, and a protecting housing encompassing the column and the associated parts.

5. A motor vehicle embodying a load receiving platform, arranged at a low elevation, a traction wheel connected with the platform and rotatable on horizontal and upright axes, a steering column with which the wheel is connected, said column movable with the wheel about said upright axis, a motor supported by the column, changeable speed gearing connection between the motor and wheel, means for shifting said gearing, a protecting housing encompassing the column and the associated parts, and a support upon which the operator may stand at any point around the housing.

6. A motor vehicle embodying a load receiving platform arranged at a low elevation, a traction wheel connected with the platform, and rotatable on horizontal and upright axes, a steering column with which the wheel is connected, said column movable with the wheel about said upright axis, a motor supported by the column, changeable speed gearing between the motor and wheel, means for shifting the gearing, means for maintaining the gears in their shifted position, and a protecting housing encompassing the column and the associated parts.

7. A motor vehicle embodying a load receiving platform arranged at a low elevation, a steering column connected therewith for rotation about an upright axis, a traction wheel connected with the column for rotation therewith about such upright axis, a motor operatively connected with the wheel, a controller, said motor and controller both supported by the column, an actuating handle connected with the column for rotating it about such upright axis, and a protecting housing for the column and the associated parts.

8. A motor vehicle embodying a load receiving platform arranged at a low elevation, a steering column connected therewith for rotation about an upright axis, a traction wheel connected with the column for rotation therewith about said upright axis, and also for rotation with respect thereto about a horizontal axis, a motor supported by the column, shiftable speed changing gear connection between the motor and wheel, and a controller for the motor supported by the column and rotatable with the column about such upright axis.

9. A motor vehicle embodying a load receiving platform arranged at a low elevation, a steering column connected therewith for rotation about an upright axis, a traction wheel connected with the column for rotation therewith about said upright axis, and also for rotation with respect thereto about a horizontal axis, a motor supported by the column, shiftable speed changing gear connection between the motor and wheel, and a controller for the motor supported by the column and rotatable with the column about such upright axis, said column and the parts connected therewith being removable as a unit from the vehicle.

10. A motor vehicle embodying a load receiving platform, arranged at a low elevation, a turntable detachably connected therewith, a steering column connected with the turntable for rotation therewith, a traction wheel connected with said table for rotation therewith and also for rotation with respect thereto about a horizontal axis, a motor supported by the column and operatively connected with the wheel, a controller also supported by the column, and means operatively connected with the column for turning the said table, wheel, motor and controller about an upright axis.

11. A motor vehicle embodying a load receiving platform, arranged at a low elevation, a turntable detachably connected therewith, a steering column connected with the turntable for rotation therewith, a traction wheel connected with said table for rotation therewith and also for rotation with respect thereto about a horizontal axis, a motor supported by the column and operatively connected with the wheel, a controller also supported by the column, and means operatively connected with the column for turning the said table, wheel, motor, and controller about an upright axis, said table detachably connected with and forming a support for the said platform.

12. A motor vehicle embodying a load receiving platform arranged at a low elevation, a turntable detachably connected therewith, a steering column connected with the turntable for rotation therewith, a traction wheel connected with said table for rotation therewith and also for rotation with respect thereto about a horizontal axis, a motor supported by the column and operatively connected with the wheel, a controller also supported by the column, and means operatively connected with the column for turning the said table, wheel, motor and controller about an upright axis, said table and the superposed parts being separable as a unit from the vehicle.

13. A motor vehicle embodying a load receiving platform arranged at a low elevation, a turntable detachably connected therewith, a steering column connected with the turntable for rotation therewith, a traction wheel connected with said table for rotation therewith and also for rotation with respect thereto about a horizontal axis, a motor supported by the column and operatively connected with the wheel, a controller also supported by the column, means operatively connected with the column for turning the said table, wheel, motor and controller about an upright axis, and a protecting housing for the column and the vehicle actuating parts.

14. A motor vehicle embodying a load receiving platform arranged at a low elevation, a turn table detachably connected therewith, a steering column connected with the turn table for rotation therewith, a traction wheel connected with said table for rotation therewith and also for rotation with respect thereto about a horizontal axis, a motor supported by the column and operatively connected with the wheel, a controller also supported by the column, means operatively connected with the column for turning the said table, wheel, motor, and controller about an upright axis, a protecting housing for the column and the vehicle actuating parts, and a support for the operator encompassing the column.

15. A motor vehicle embodying a load receiving platform arranged at a low elevation, a traction wheel arranged adjacent one end of the platform for movement about horizontal axes, a steering column with which the wheel is connected for rotation about such upright axis, operating mechanism supported by the column for movement therewith about such upright axis, a support for the operator encompassing the column, and brake operating mechanism adjacent and accessible from any point about the column.

16. A motor vehicle embodying a load receiving platform arranged at a low elevation, a traction wheel arranged adjacent one end of the platform for movement about said horizontal and upright axes, a steering column with which the wheel is connected for rotation about such upright axis, operating mechanism supported by the column for movement therewith about such upright axis, a support for the operator encompassing the column, a protecting housing for the column and the wheel operating mechanism, and brake operating mechanism adjacent and accessible from any point about the column.

17. A motor vehicle embodying a load receiving platform arranged at a low elevation and having an opening adjacent one end, a traction wheel arranged in said opening, a turntable with which the traction wheel is connected for rotation about a horizontal axis, said table supporting the platform and rotatable about an upright axis, a steering column connected with the table, a motor supported by the column and operatively connected with the wheel for rotating it about such horizontal axis, a handle operatively connected with the column for rotating the said table, and a protecting housing for the wheel and operating parts, said housing supported independently of the said table and column, said column, wheel and actuating parts being removable as a unit from the truck and housing.

18. A motor vehicle embodying a load receiving platform arranged at a low elevation and having an opening adjacent one end, a traction wheel arranged in said opening, a turntable with which the traction wheel is connected for rotation about a horizontal axis, said table supporting the platform and rotatable about an upright axis, a steering column connected with the table, a motor supported by the column and operatively connected with the wheel for rotating it about such horizontal axis, a handle operatively connected with the column for rotating the said table, and a protecting housing for the wheel and operating parts, said housing supported independently of the said table and column, said .column, wheel and actuating parts being removable as a unit from the truck and housing, said platform encompassing the steering column.

19. A motor vehicle embodying a load receiving platform arranged at a low elevation and having an opening adjacent one end, a traction wheel arranged in said opening, a turntable with which the traction wheel is connected for rotation about a horizontal axis, said table supporting the platform and rotatable about an upright axis, a steering column connected with the table, a motor supported by the column and operatively connected with the wheel for rotating it about such horizontal axis, a handle operatively connected with the column for rotating the said table, a protecting housing for the wheel anl operating parts, said housing supported independently of the said table and column, said column, wheel and actuating parts being removable as a unit from the truck and housing, said platform encompassing the column, and brake actuating means adjacent the column and accessible from any point about said column.

20. A motor vehicle embodying a load receiving platform, a hollow steering head, a traction wheel connected with the head, mechanism interior of the head for driving the traction wheel, said mechanism embodying a motor located directly above the wheel, and a handle operatively connected with the steering head for actuating said head.

21. A motor vehicle embodying a load receiving platform, a hollow steering head rotatable about an upright axis, a traction wheel connected with the head for rotation about such axis, and for rotation about a horizontal axis, a motor within the head separate from and located directly above the wheel, a connection between the motor and traction wheel for rotating it about such horizontal axis, and an operating handle for swinging the head about the upright axis.

22. A motor vehicle embodying a load receiving platform, a hollow steering head rotatable about an upright axis, a traction wheel connected with the head for rotation about such axis, and for rotation about a horizontal axis, a motor within the head separate from and located directly above the wheel, a connection between the motor and traction wheel for rotating it about such horizontal axis, and an operating handle for swinging the head about the upright axis, said handle connected directly with the steering head.

23. A motor vehicle embodying a load receiving platform, a steering column connected therewith for rotation about an upright axis, a traction wheel connected with the said column, for rotation about such axis, and also for rotation about a horizontal axis, a motor supported by the column and rotatable therewith, said motor connected with the wheel for rotating the latter about the horizontal axis, a casing encompassing all of the parts and connected with the column for bracing the latter, and means for swinging the column and the parts connected therewith about such upright axis.

24. A motor vehicle embodying a load receiving platform, a steering column connected therewith for rotation about an upright axis, a traction wheel connected with the said column, for rotation about such axis and also for rotation about a horizontal axis, a motor supported by the column and rotatable therewith, said motor connected with the wheel for rotating the latter about the horizontal axis, a casing encompassing all the parts and connected with the column for bracing the latter, and a steering handle connected directly with the casing for swinging the column about the upright axis.

25. A motor vehicle embodying a load receiving platform, a steering post, a traction wheel connected with the post, a motor mounted on the post directly above the wheel, an electric controller for the motor also mounted on the post, and a hand wheel operatively connected with the upper end of the post.

26. A motor vehicle embodying a load receiving platform, a steering post, a traction wheel connected with the post, a motor mounted on the post, an electric controller for the motor also mounted on the post, a hand wheel operatively connected with the post, and a housing inclosing all of the parts and bracing said post.

27. A motor vehicle embodying a load receiving platform, a traction wheel, a motor for driving the wheel, an electric controller for the motor, means common to the wheel, motor and controller for supporting them to move about an upright axis, and a steering wheel connected with the upper end of the said means.

28. A motor vehicle embodying a load receiving platform, a traction wheel, a motor for driving the wheel, an electric controller for the motor, means common to the wheel, motor and controller for supporting them to move about an upright axis, all of the said parts being detachable from the vehicle as a unit, and means connected with the upper end of the supporting means for shifting the latter.

29. A motor vehicle embodying a supporting structure, a turn-table connected with the structure, uprights mounted upon the turn-table, a traction wheel between the uprights, a motor for driving the traction wheel, said motor also supported between the uprights, and a steering wheel operatively connected with the uprights for turning the said table.

30. A motor vehicle embodying a supporting structure, a turn-table connected with the structure, uprights mounted upon the turn-table, a traction wheel between the uprights, a motor for driving the traction wheel, said motor also supported between the uprights, and a housing connected with the said supporting structure, said housing incasing and supporting the uprights.

31. A motor vehicle embodying a load receiving platform, a steering post, a traction wheel connected with the post, a motor mounted on the post, a hand wheel operatively connected with the post, and a housing inclosing all of the parts and bracing said post.

32. A motor vehicle embodying a supporting structure, a turn-table connected with the structure, uprights connected with the turn-table, a traction wheel between the uprights, a motor for driving the traction wheel, said motor also supported by the uprights, and a housing connected with said supporting structure, said housing incasing and supporting the uprights.

33. A motor vehicle embodying a supporting structure, a turn-table connected with the structure, uprights connected with the turn-table, a traction wheel between the uprights, and a motor for driving the traction wheel, said motor also supported by the uprights, said supporting structure incasing the driving mechanism.

34. A motor vehicle embodying a supporting structure, a traction wheel, means mounting said traction wheel for rotation on upright and horizontal axes with respect to the supporting structure, said means embodying a standard, end thrust and lateral thrust bearings for the standard, between the standard and the said supporting structure, and a motor for driving the traction wheel and supported by the standard above the said traction wheel, and intermediate the said bearings, the axis of the motor being substantially horizontal.

In testimony whereof I have signed my name to this specification, in the presence of two subscribing witnesses, on this 31st day of July, A. D. 1915.

HERBERT J. SAUVAGE.

Witnesses:
F. A. UMSTED,
J. L. JOCHUM, Jr.